Figure 1:
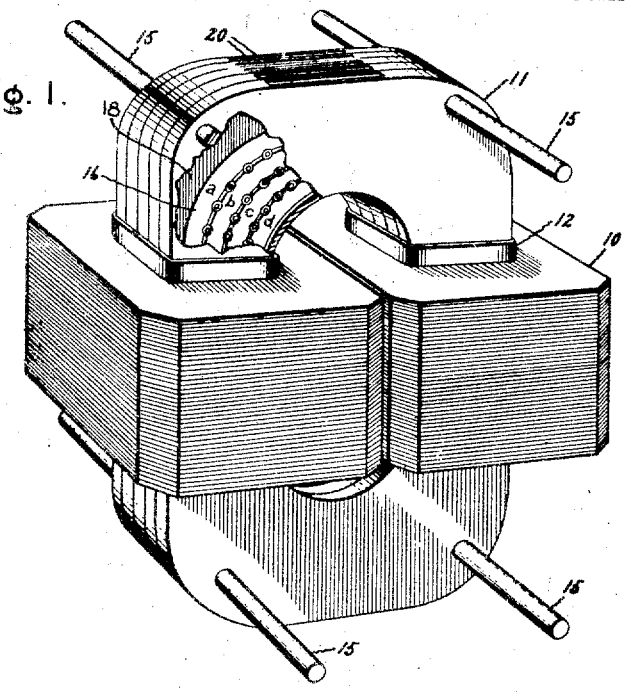

Reissued June 22, 1920.

S. E. JOHANNESEN.

HIGH VOLTAGE TRANSFORMER.

APPLICATION FILED MAY 18, 1920.

14,891.

3 SHEETS—SHEET 1.

Inventor:
Svend E. Johannesen,
by Albert G. Davis
His Attorney.

Reissued June 22, 1920.
S. E. JOHANNESEN.
HIGH VOLTAGE TRANSFORMER.
14,891
APPLICATION FILED MAY 18, 1920.
3 SHEETS—SHEET 2.
Fig. 4.
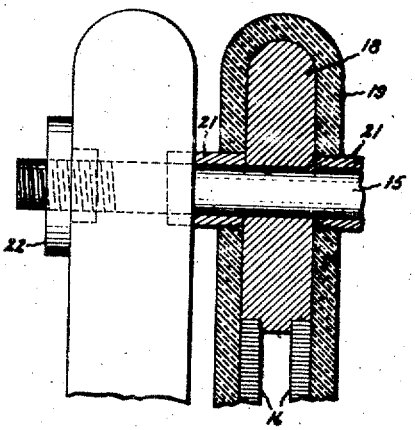
Fig. 5.
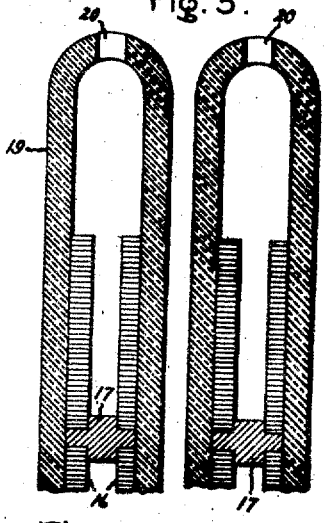
Fig. 6.
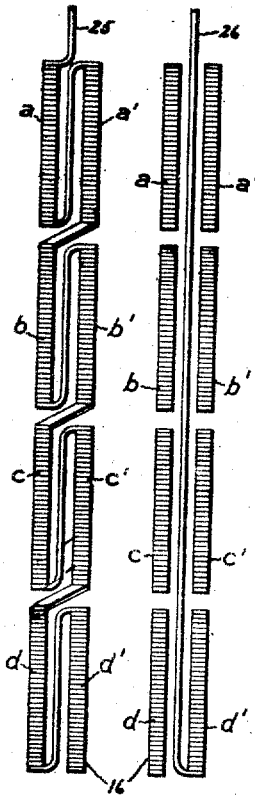
Fig. 7.
Fig. 8.
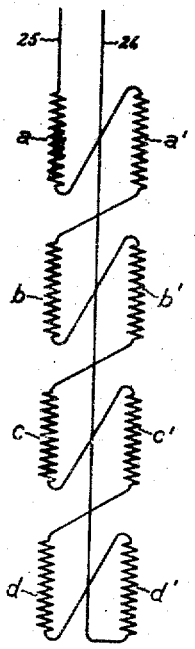
Fig. 9.
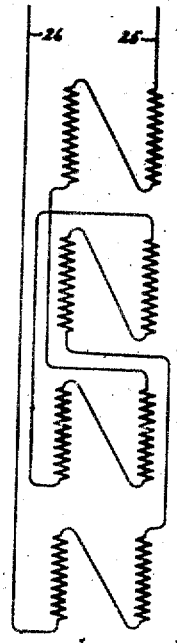
Fig. 10.
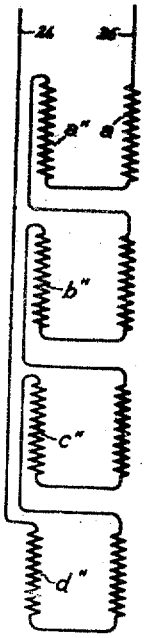
Inventor:
Svend E. Johannesen,
by Albert G. Davis
His Attorney.

S. E. JOHANNESEN.

Reissued June 22. 1920. HIGH VOLTAGE TRANSFORMER. 14.891.

APPLICATION FILED MAY 18, 1920.

3 SHEETS—SHEET 3.

Inventor:
Svend E. Johannesen
by Albert G. Davis
His Attorney

UNITED STATES PATENT OFFICE.

SVEND E. JOHANNESEN, OF PITTSFIELD, MASSACHUSETTS, ASSIGNOR TO GENERAL ELECTRIC COMPANY, A CORPORATION OF NEW YORK.

HIGH-VOLTAGE TRANSFORMER.

14,891. Specification of Reissued Letters Patent. Reissued June 22, 1920.

Original No. 1,337,915, dated April 20, 1920, Serial No. 244,836, filed July 15, 1918. Application for reissue filed May 18, 1920. Serial No. 382,694.

*To all whom it may concern:*

Be it known that I, SVEND E. JOHANNESEN, a citizen of the United States, residing at Pittsfield, county of Berkshire, State of Massachusetts, have invented certain new and useful Improvements in High-Voltage Transformers, of which the following is a specification.

My invention relates to transformers, some reactances, and like electrical apparatus and has for its objects an improved construction and arrangement of parts whereby such apparatus may be more economically manufactured.

My invention is particularly applicable to shell-type transformers but may also be applied to core-type transformers and is designed to afford a more efficacious manner of constructing, mounting and ventilating the windings than has heretofore been known.

In shell-type transformers, as heretofore generally constructed, the coiled conductors comprising the windings were supported in press-board casings which were in turn supported by the core; the assembled core when clamped together being anchored to a suitable base. In this construction barriers of insulating material were necessarily inserted between the coils to provide the necessary resistance to puncture, creepage, etc. Such barriers, however, reduced the ventilating passages and consequently the full-load capacity of the transformer, the alternative construction being an increase in the winding space with a corresponding decrease in the space-factor, together with an increased tendency for the windings to sag.

In the practice of my invention these difficulties are avoided by reason of my novel construction of the coils, in which both adequate insulation and ventilation are provided without the use of barriers, the windings being supported independently of the core.

In my new construction, the windings are so arranged that the potential drop between portions of the windings is relatively small so that little insulation is needed between turns and such portions. As a consequence I insulate the windings in groups, a plurality of associated groups preferably being incased together in an insulating jacket of high dielectric strength; such jacket being formed to admit a free circulation of the cooling medium between the groups over the edge of the conductors in the winding.

Figure 2:
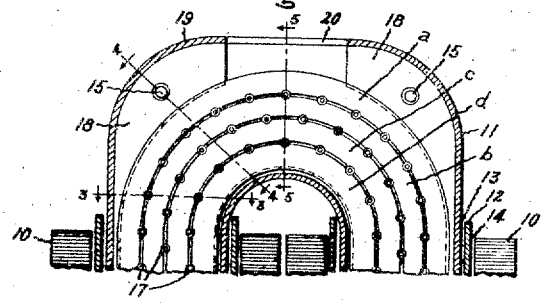
Figure 3:
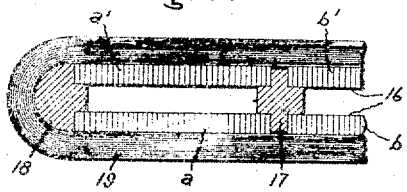
Figure 11:
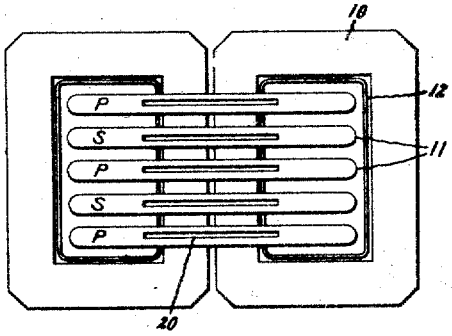
Figure 12:
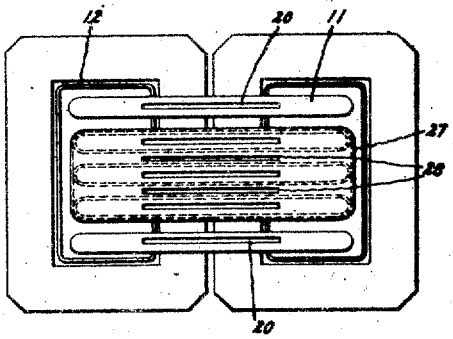
Figure 13:
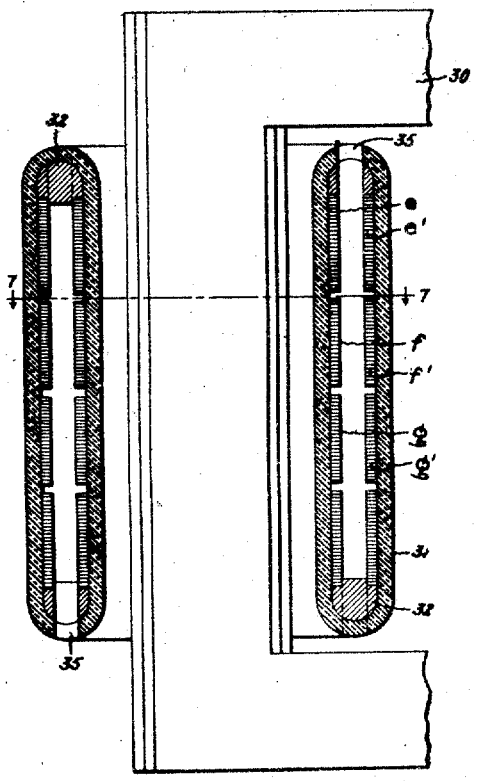
Figure 14:
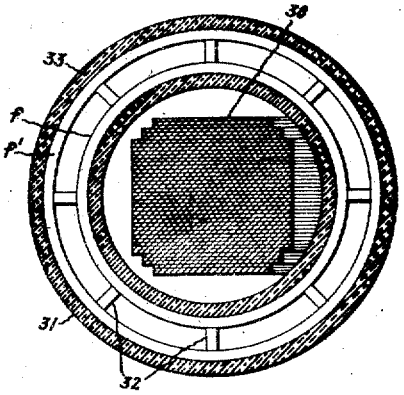

For a more complete understanding of the nature and objects of my invention, reference should be had to the accompanying drawing in which Figure 1 is a perspective view showing the core and coils of a transformer embodying my invention in assembled relation; Fig. 2 is a vertical section through the transformer in the plane of the coils, the lower part being broken away; Figs. 3, 4 and 5 are fragmentary sections taken on the lines 3—3, 4—4 and 5—5 respectively in Fig. 2; Figs. 6 and 7 are detailed views showing the manner of connecting the leading-in conductors to the windings; Figs. 8, 9 and 10, show, in diagrammatic fashion different schemes for arranging the coil groups in transformer windings constructed in accordance with my invention; Fig. 11 is a top plan view of the arrangement of windings shown in Fig. 1, while Fig. 12 shows a plan view of a modified arrangement; Fig. 13 shows a core-type transformer partly in elevation and partly in section, which has a cylindrical winding embodying my invention; and Fig. 14 is a section taken on the line 7—7 in Fig. 13.

Referring now to the drawings, and to Fig. 1 in particular, 10 represents the core of laminated magnetic material suitable for a shell-type transformer, in the windows of which core are secured the coils 11 which are protected from the core laminations by the insulating boxing 12. The boxing 12 is spaced both from the windings and the core as indicated in Fig. 2 in order to provide inner and outer ventilating passages 13 and 14 respectively.

I will now describe in detail the structure of coils 11 which are supported in position, not by the core, but by bolts 15 which are passed through a suitable insulating structure in the corners of each of the coils and are made fast in the frame or casing (not shown) which supports the core 10.

The coiled electrical conductors 16 (see Fig. 3) which compose the coils 11 are wound in groups *a*, *b*, *c*, *d*, each group being composed of a convenient number of turns. The conductors 16 are preferably copper strap which is covered by one or more coverings of cotton, silk or other insulating material; the groups when formed being varnished or otherwise treated to render them impervious to water and moisture.

The groups $a$, $b$, $c$, $d$, are assembled in concentric relation in a plane, the spaces between the groups being maintained by a plurality of cylindrical insulators 17 formed with reduced ends as clearly indicated in Fig. 3.

At the inner and outer edges of an assembled group $a$, $b$, $c$, $d$, I employ an insulating member 18 with rounded edges which serves not only to determine the contour of the finished coil but also as a base through which the bolts 15 are passed.

A finished coil has a plurality of associated groups $a$, $b$, $c$, $d$ and $a'$, $b'$, $c'$, $d'$, assembled in spaced relation in two planes, one on each side of the insulating spacers 17 and 18, the whole being enveloped with a plurality of layers of insulating material 19, such material preferably consisting of fuller board tapered back with cheese cloth where very high voltages are used, and muslin for the lower voltages, the whole being varnished and treated to form a substantially solid insulating jacket.

In order to provide ventilation for the interior of a coil constructed in this manner, I cut comparatively unrestricted slots, such as shown at 20, in both the top and bottom edges of the insulating jacket.

The bolts 15, which support the coils, must also be well insulated and are preferably themselves constructed of insulating material, the substance known to the trade as "micarta" answering well this purpose. The proper spacing of the coils 11 along the bolts 15 is insured by insulating sleeves or bushings 21 which are slipped over the bolts 15 but abut against the coil structure as shown in Fig. 4, the whole being secured by suitable nuts 22 which engage with the threaded extremities of the bolts 15.

The electrical connections between groups $a$, $b$, $c$, $d$, etc., in the interior of a coil are made in such a manner as to occasion the least possible strain on the insulation, one mode being shown in Figs. 6 and 7 and diagrammatically shown in Fig. 8, alternative modes being shown in Figs. and 10.

In order that the connections shown in Fig. 6 may be more clearly understood, I shall assume that the left-hand and associated right-hand groups $a$, $b$, $c$, $d$ and $a'$, $b'$, $c'$, $d'$ respectively compose a coil across whose terminals 40,000 volts is to be impressed. Consequently there must be a difference in potential of 5000 volts across the conductors of each of the eight groups. To diminish the electrostatic strain in the intervening dielectric for the groups, I connect the last turn in group $a$ to the first turn in group $a'$, its last turn being connected to the first turn in group $b$ and so on until we come to the last turn of group $d'$. From the first turn of group $a$ to the last turn of group $d'$, there is to be a difference in potential of 40,000 volts, to which turns the leading-in taps 25 and 26 are connected. This arrangement is convenient because the difference in potential between the first and last turns of any two groups is only 5000 volts; that is, between the first turn of $a$ and the first turn of $a'$ there is 5000 volts, and between the last turn of $a$ and the first turn of $b$ there is 5000 volts and so on. By this arrangement the lead 25 does not pass adjacent any conductor of a greater potential difference than 5000 volts so that its insulation is a comparatively simple matter; while the other lead 26 which connects with the innermost turn of group $d'$ is led straight out through the coil as shown, or it may be led over the outside and may readily be insulated as heavily as desired, especially adjacent the conductors in groups $a$ and $a'$. These connections for the groups $a$, $a'$, $b$, $b'$, etc., and the manner of connecting the leads 25 and 26 are indicated in Fig. 8.

An arrangement in which the relative arrangement of groups $b$, $b'$ and $c$, $c'$ has been interchanged is shown in Fig. 9, while Fig. 10 shows an arrangement in which the groups $a''$, $b''$, $c''$, $d''$, which correspond to groups $a'$, $b'$, $c'$, $d'$ in Fig. 8, are connected in inverted order; that is, the turns progress from inside outward instead of from outside inward. Still other arrangements will occur to those skilled in the art.

The primary and secondary coils for my improved transformer are constructed substantially similar as above described except that the size and number of conductors in each group comprising a coil 11 is determined by the ratio of transformation.

In an assembled transformer the primary and secondary coils may be interleaved as indicated at P and S in Fig. 11, or all the coils 11 of either kind may be grouped together. This latter arrangement is of particular advantage for the high voltage coils, which group as a whole may be enshrouded in an insulating jacket shown at 27 in Fig. 12.

The jacket 27, in this instance, is not only provided at top and bottom with slots registering with 20 in coils 11 to admit the circulation of a cooling and ventilating medium to the interior of the coils 11, but is provided in addition with slots 28 at top and bottom admitting the cooling and ventilating medium to the spaces between the coils 11.

A shell-type transformer, constructed in this manner, is very rugged and requires a smaller number of parts than has heretofore been used in their construction, the jacket of fuller board and cheese cloth providing adequate insulation for the windings from each other and from ground, where very high voltages are used, a jacket of muslin, treated and varnished being sufficient for the lower voltages. The provision of openings 20 at the top and bottom of each coil, for admitting the cooling and ventilating medium (which may be oil, air, or other medium) to pass freely over one entire surface of an assembled winding, insures a rapid and uniform dissipation of the heat from the winding.

While I have shown and described my invention in the above as applied to shell-type transformers, it is by no means confined to this type for I have contemplated using it in connection with core-type transformers using any suitable known type of winding; one embodiment thereof being shown in Figs. 13 and 14 which I will now describe.

In these figures, 30 denotes a core having a cylindrical coil 31 surrounding and suitably spaced from one leg of the core 30.

The coil 31 comprises inner and outer superimposed concentric groups of coiled conductors *e*, *e'*, *f*, *f'*, etc. Radial spacers, such as shown at 32, are preferably arranged in superimposed staggered relation to insure the proper spacing of the groups. The assembled groups have annular end spaces 32 formed to give a rounded edge to the cylindrical coil, the whole being secured together by the insulating jacket 33. The jacket 33 has openings 35 cut in its top and bottom edges so that the cooling and ventilating medium is freely admitted to the space between the concentric groups of coiled conductors, passing over one entire cylindrical surface of each winding to quickly absorb and dissipate the heat from each winding.

A completely assembled transformer, such as I have shown in Fig. 13, would have one or more suitably connected cylindrical coils 31 surrounding each leg thereof.

Having now described what is at present the best means known to me for carrying out an embodiment of my invention, I would have it understood that such means are merely illustrative and that I do not mean to be limited thereby to the exact details shown nor in the choice of recognized equivalents except as defined in my claims hereunto appended.

What I claim as new and desire to secure by Letters Patent of the United States, is,—

1. In a transformer, the combination with a core, of a coil comprising a plurality of associated groups of coiled conductors, insulating spacers for maintaining said groups in a predetermined spaced relation and an insulating jacket enveloping said groups, said jacket being provided with unrestricted openings for admitting a cooling and ventilating medium to circulate between said groups and over the edges of said conductors.

2. In a transformer, the combination with a core, of a coil comprising a plurality of associated groups of coiled conductors, insulating spacers for maintaining said groups in a predetermined spaced relation, the spacers at the bounding edges of said groups being shaped to give the coil a desired contour, and an insulating jacket enveloping said groups, said jacket being provided with unrestricted openings for admitting a cooling and ventilating medium to circulate between said groups and over the edges of said conductors.

3. In a transformer, the combination with a core, of a coil comprising a plurality of associated groups of coiled conductors, insulating spacers for maintaining said groups in a predetermined spaced relation, the spacers at the bounding edges of groups being shaped to give the coil rounded edges, coil supporting bolts passing through the edge spacers, and an insulating jacket enveloping said groups, said jacket being provided with unrestricted openings for admitting a cooling and ventilating medium to circulate between said groups and over the edges of said conductors.

4. In a transformer, the combination with a core, of a coil comprising a plurality of associated groups of coiled conductors, insulating spacers for maintaining said groups in a predetermined spaced relation, said groups having electrical connections between end turns so arranged that the potential difference between adjacent portions of said groups is not greater than a predetermined fraction of the potential difference across the coil's terminals, and an insulating jacket enveloping said groups provided with unrestricted ventilating openings.

5. In a transformer, the combination with a core, of a coil comprising a plurality of associated groups of coiled conductors, insulating spacers for maintaining said groups in a predetermined spaced relation, terminals for said coil, one being connected in series with an outermost turn of the connected groups, the other being connected to an innermost turn and led straight out of the coil traversing the space between said groups, and an insulating jacket enveloping said groups provided with unrestricted ventilating openings.

6. In a transformer, the combination with a shell type core, of a coil structure composed of a plurality of units comprising windings and an insulating structure, supporting bolts passing through said coil structure, and means for securing said coil units along said bolts in predetermined spaced relation.

7. In a transformer, the combination with a shell type core, of a coil structure composed of a plurality of units comprising windings and an insulating structure, supporting bolts passing through said coil structure, insulating sleeves on said bolts between and abutting said coil units, and nuts engaging with the extremities of said bolts to hold said coils in predetermined positions along said bolts.

8. In a transformer, the combination with a shell-type core of laminated magnetic material, of a plurality of coils passing through the windows thereof, said coils comprising associated groups of conductors concentrically arranged in planes spaced apart and having insulating spacers about the edges thereof, supporting bolts passing through the spacers on the outside edge of said coils, and means for securing said coils along said bolts in a predetermined spaced relation.

9. In a transformer, the combination with a core of laminated magnetic material, of a plurality of coils passing through the windows thereof, said coils comprising associated groups of conductors concentrically arranged in planes spaced apart and having insulating spacers about the edges thereof supporting bolts passing through said spacers, an insulating jacket enveloping each coil and provided with unrestricted ventilating openings, and means for securing said coils along said bolts in a predetermined spaced relation.

10. In a transformer, the combination with a core of laminated magnetic material, of a plurality of coils passing through the windows thereof, said coils comprising associated groups of conductors concentrically arranged in planes spaced apart and having insulating spacers about the edges thereof, means for securing said coils along said bolts in a predetermined spaced relation, an insulating jacket enveloping each coil and provided with unrestricted ventilating openings and an additional insulating jacket enveloping a group of coils having ventilating openings in register with the first mentioned openings and additional openings communicating with the spaces between said coils.

11. In a transformer, the combination with a core of laminated magnetic material, of coils composed of associated groups of coiled conductors arranged concentrically in planes in spaced relation, and an insulating jacket for each coil provided with openings in the top and bottom edges.

12. In a transformer, the combination with a core of laminated magnetic material, of coils composed of associated groups of coiled conductors arranged concentrically in planes in spaced relation, supporting bolts passing through said coils, means for securing said coils along said bolts in a predetermined spaced relation, an insulating jacket for each coil provided with openings in the top and bottom edges, and an additional jacket enveloping a group of coils having openings in register with the first said openings and additional openings communicating with the spaces between said coils.

13. A coil of winding for electrical apparatus comprising a plurality of associated groups of coiled conductors, insulating spacers for maintaining said groups in a predetermined spaced relation and an insulating jacket enveloping said groups, said jacket being provided with unrestricted openings for admitting a cooling and ventilating medium to circulate between said groups and over the edges of said conductors.

14. A coil of winding for electrical apparatus comprising a plurality of associated groups of coiled conductors, insulating spacers for maintaining said groups in a predetermined spaced relation, the spacers at the bounding edges of said groups being shaped to give the coil a desired contour, and an insulating jacket enveloping said groups, said jacket being provided with unrestricted openings for admitting a cooling and ventilating medium to circulate between said groups and over the edges of said conductors.

15. A coil of winding for electrical apparatus comprising a plurality of associated groups of coiled conductors, insulating spacers for maintaining said groups in a predetermined spaced relation, the spacers at the bounding edges of groups being shaped to give the coil rounded edges, coil supporting bolts passing through the edge spacers, and an insulating jacket enveloping said groups, said jacket being provided with unrestricted openings for admitting a cooling and ventilating medium to circulate between said groups and over the edges of said conductors.

16. A coil of winding for electrical apparatus comprising a plurality of associated groups of coiled conductors, insulating spacers for maintaining said groups in a predetermined spaced relation, said groups being arranged in parallel planes spaced apart, and an insulating jacket enveloping said groups hugging the exterior surfaces of said groups and provided with diametrically opposite unrestricted ventilating openings communicating with the space between the planes of said groups.

17. A coil of winding for electrical apparatus comprising a plurality of associated groups of coiled conductors, insulating spacers for maintaining said groups in a predetermined spaced relation, each of said groups being formed with a plurality of turns of an insulated flat conductor, said groups being arranged in parallel planes spaced apart and connected in series so that the difference in potential between adjacent portions of said groups is not greater than a predetermined fraction of the potential across the coil's terminals, and an insulating jacket enveloping said groups hugging the exterior surfaces of said groups and provided with diametrically opposite unrestricted ventilating openings communicating with the space between the planes of said groups.

18. A coil of winding for electrical apparatus comprising a plurality of associated groups of coiled conductors, insulating spacers for maintaining said groups in a predetermined spaced relation, each of said groups being formed with a plurality of turns of an insulated flat conductor, said groups being arranged in parallel planes spaced apart and connected in series, one terminal of the coil being connected to the outermost turn of one of the outer groups, the other terminal being connected to the innermost turn of an inner group and insulated along that portion extending adjacent other groups, and a ventilated insulating jacket enveloping said groups and hugging their outer surfaces.

19. A coil of winding for electrical apparatus comprising a plurality of associated groups of coiled conductors, insulating spacers for maintaining said groups in a predetermined spaced relation, each of said groups being formed with a plurality of turns of an insulated flat conductor, said groups being arranged in two parallel planes spaced apart and connected in series so that the difference of potential between homologous portions of two adjacent groups is a predetermined constant fraction of the coil's terminal potential difference, and an insulating jacket enshrouding said groups hugging their outer surfaces and provided with unrestricted openings in its top and bottom edges.

20. A winding for electrical apparatus comprising a plurality of associated coils in spaced relation, each coil having an individual ventilated insulating jacket, and an enveloping insulating jacket for the jacketed coils provided with ventilating openings communicating both with the ventilating passages in the first mentioned jackets and with the spaces between said coils.

21. A winding for electrical apparatus comprising a plurality of associated flat coils, an insulating rod having spacers thereon passing through the planes of said coils for maintaining them in a predetermined spaced relation, each coil having an individual ventilating insulating jacket, and an enveloping insulating jacket for the jacketed coils hugging the exterior surfaces of the outermost coils and provided with ventilating openings communicating both with the ventilating passages in the first mentioned jackets and with the spaces between said coils.

In witness whereof, I have hereunto set my hand this 8th day of July, 1918.

SVEND E. JOHANNESEN.